(12) United States Patent
Su et al.

(10) Patent No.: US 9,581,522 B2
(45) Date of Patent: Feb. 28, 2017

(54) DISTRIBUTED SENSING OPTICAL FIBER MULTI-OBJECTIVE MULTI-DEGREE-OF-FREEDOM STATIC AND DYNAMIC TEST DEVICE AND METHOD

(71) Applicant: Hohai University, Nanjing (CN)

(72) Inventors: Huaizhi Su, Nanjing (CN); Meng Yang, Nanjing (CN)

(73) Assignee: HOHAI UNIVERSITY, Nanjing (CN)

(*) Notice: Subject to any disclaimer, the term of this patent is extended or adjusted under 35 U.S.C. 154(b) by 0 days.

(21) Appl. No.: 14/888,708

(22) PCT Filed: Dec. 26, 2014

(86) PCT No.: PCT/CN2014/095071
§ 371 (c)(1),
(2) Date: Nov. 3, 2015

(87) PCT Pub. No.: WO2016/011775
PCT Pub. Date: Jan. 28, 2016

(65) Prior Publication Data
US 2016/0161363 A1    Jun. 9, 2016

(30) Foreign Application Priority Data

Jul. 22, 2014 (CN) .......................... 2014 1 0351312

(51) Int. Cl.
*G01M 11/00* (2006.01)
*G01D 5/353* (2006.01)
*G01M 11/02* (2006.01)

(52) U.S. Cl.
CPC ..... *G01M 11/3109* (2013.01); *G01D 5/35364* (2013.01); *G01M 11/00* (2013.01); *G01M 11/02* (2013.01); *G01M 11/319* (2013.01)

(58) Field of Classification Search
CPC ...... G01M 11/00; G01M 11/02; G01M 11/30; G01M 11/31; G01M 11/3109;
(Continued)

(56) References Cited

U.S. PATENT DOCUMENTS 5,623,336 A * 4/1997 Raab .................. G01J 3/4412
356/73.1
6,541,758 B2 * 4/2003 Yashiro ................. G01F 23/686
250/227.14
(Continued)

FOREIGN PATENT DOCUMENTS

CN          1115380 A      1/1996
CN          1731119 A      2/2006
(Continued)

*Primary Examiner* — Gordon J Stock, Jr.
(74) *Attorney, Agent, or Firm* — Gokalp Bayramoglu

(57) ABSTRACT

The present invention relates to a distributed sensing optical fiber performance multi-objective multi-degree-of-freedom static and dynamic test integrated platform and a test method. Wherein an optical fiber multi-degree-of-freedom fixing system is sequentially connected with an artificial loading and unloading device and an oil pressure control loading and unloading device, and an optical fiber under test is connected with the optical fiber multi-degree-of-freedom fixing system and a distributed optical fiber Brillouin frequency shift acquisition system; and test on performance of optical fiber is achieved by controlling devices in the optical fiber multi-degree-of-freedom fixing system. The device of the present invention has a large number of advantages such as a simple structure, a low cost, convenient operation, less disturbance, many test classes, strong adaptability, stable performance and convenient loading and unloading.

10 Claims, 10 Drawing Sheets

(58) Field of Classification Search
CPC ............... G01M 11/3172; G01M 11/319;
G01D 5/268; G01D 5/35364
See application file for complete search history.

(56) References Cited

U.S. PATENT DOCUMENTS

| | | | |
|---|---|---|---|
| 6,698,919 B2* | 3/2004 | Chi | G01D 5/35303 356/32 |
| 6,703,635 B2* | 3/2004 | Yashiro | G01F 23/0038 250/577 |
| 2008/0314579 A1* | 12/2008 | Den Boer | E21B 19/002 166/70 |
| 2010/0033711 A1* | 2/2010 | Hayashi | G01D 5/35303 356/73.1 |
| 2011/0135247 A1* | 6/2011 | Achara | E21B 47/011 385/12 |
| 2015/0219443 A1* | 8/2015 | Xue | G01V 8/16 356/32 |

FOREIGN PATENT DOCUMENTS

| | | |
|---|---|---|
| CN | 101201292 A | 6/2008 |
| CN | 101241040 A | 8/2008 |
| CN | 202693267 U | 1/2013 |
| CN | 202814682 U | 3/2013 |
| CN | 103048070 A | 4/2013 |
| CN | 103175558 A | 6/2013 |
| CN | 103328933 A | 9/2013 |
| CN | 104142224 A | 11/2014 |
| CN | 204142466 U | 2/2015 |
| JP | H07325023 A | 12/1995 |

* cited by examiner

DISTRIBUTED SENSING OPTICAL FIBER MULTI-OBJECTIVE MULTI-DEGREE-OF-FREEDOM STATIC AND DYNAMIC TEST DEVICE AND METHOD

FIELD OF THE INVENTION

The present invention relates to a distributed sensing optical fiber performance multi-objective multi-degree-of-freedom static and dynamic test integrated platform and a test method.

DESCRIPTION OF RELATED ART

With constant improvement of people's safety consciousness and widespread construction of engineering in various fields, healthy monitoring of structure is more important and urgent, and optical fiber smart materials, as a kind of functional sensor, are increasingly applied to the field of healthy monitoring of structure. Relative to a sensing monitoring system and a point-mode optical fiber monitoring system based on electric signals, a distributed optical fiber monitoring system shows a huge advantage in technical difficulty, content of monitoring quantity, index and monitoring occasion and range.

Compared with optical parameters of a distributed optical fiber sensor, some physical parameters thereof are not completely quantitative technical indexes, a common practice at home and abroad is carrying out a related test, a product non-destructive in the test is a qualified product, occurrence of the test is a probability event, it is impossible to carry out a test on each part of each optical fiber, and thus performance of optical parameters applied to actual engineering is basically unknown, even if in terms of qualified optical fiber on which non-destructive testing has been carried out, the degree of performance thereof is short of quantitative cognition, which thus brings about great inconvenience and waste to model selection, design, production, procurement, construction and use of the optical fiber.

In terms of current optical fiber application fields at home and abroad, parameters of the distributed optical fiber sensor used by users are basically parameters conventionally calibrated when the optical fiber leaves the factory. When applied to relatively complicated working environments, particularly for special field working environments of complex giant engineering such as hydraulic structures, the parameters have effects on reliability of monitoring results; especially mechanical performance and sensing performance of the distributed optical fiber sensor significantly affect actual application precision.

Different optical fiber raw materials or various indexes of the optical fiber manufactured under different optical fiber production technologies vary greatly, in situations of different optical fiber manufacturers, different optical fiber models, different sheath materials and different production batches for the same optical fiber model, basic parameters of the optical fiber also vary, and thus both scientific research and production application have become prerequisite work to be developed at first for test on distributed optical fiber mechanical performance and sensing performance.

Tensile fracture force of the optical fiber is small, and in order to timely and precisely capture and track a deformation mechanism in generation, development and the whole life cycle of destruction thereof, it is urgent to study a precise and flexible multi-objective optical fiber test platform; as the optical fiber sensing technology develops towards intelligent, digital, integration and miniaturization directions, a technology that monitors spatial resolution thereof is constantly improved, it is a necessary tendency to monitor a micro structure, and in order to better match development of the distributed optical fiber sensing technology, it is necessary to develop a portable multi-objective test integration platform with an adjustable range, precise testing and a simple structure.

SUMMARY OF THE INVENTION

Technical Problem

An objective of the present invention is to provide a more effective and accurate static and dynamic multi-degree-of-freedom optical fiber performance test platform and a test method with respect to the shortcomings in the prior art so as to solve test problems such as mechanical performance and sensing performance of distributed sensing optical fiber in actual engineering, to change some performance of tight tube optical fiber from one qualitative index into one quantitative index, and extend it from a common meaning to a specific engineering actual application concept; the device and the method of the present invention can carry out a high-precision optical fiber mechanical performance indoor calibration test, and can also be oriented to test work before the optical fiber is applied to actual engineering; when more precise calibration results are required, computation can be performed multiple times, a normal distribution principle is obeyed according to computation results, and more precise calibration results are obtained finally.

Technical Solution

The present invention adopts the following technical solution:

The distributed sensing optical fiber multi-objective multi-degree-of-freedom static and dynamic test device of the present invention includes an optical fiber multi-degree-of-freedom fixing system, an artificial loading and unloading device, an oil pressure control loading and unloading device, an optical fiber under test, a distributed optical fiber Brillouin frequency shift acquisition system, and a data processing and analysis system; the optical fiber multi-degree-of-freedom fixing system is sequentially connected with the artificial loading and unloading device and the oil pressure control loading and unloading device, and the optical fiber under test is connected with the optical fiber multi-degree-of-freedom fixing system and the distributed optical fiber Brillouin frequency shift acquisition system; test on performance of optical fiber is achieved by controlling devices in the optical fiber multi-degree-of-freedom fixing system; the distributed optical fiber Brillouin frequency shift acquisition system is configured to acquire Brillouin frequency shift magnitude and other optical fiber optics information when the optical fiber is under a static or dynamic stress condition; and the data processing and analysis system is configured to online process and analyze digital information acquired by the distributed optical fiber Brillouin frequency shift acquisition system, a force sensor, a high sensitive thermometer and the like.

According to the distributed sensing optical fiber multi-objective multi-degree-of-freedom static and dynamic test device of the present invention, an initial-end elastic fixation device penetrates a curved front storehouse through a fastening screw to fix the initial-end elastic fixation device onto an initial fixing-end placing table, the optical fiber passes through a small-bore optical fiber connection channel in the curved front storehouse and a micro-bore optical fiber connection channel in a high elastic inner ring wall, axial pressure is exerted on the high elastic inner ring wall by rotating an adjusting bolt on a connecting screw, transverse pressure is exerted on the high elastic inner ring wall through a round L-shaped outer ring wall, and hoop constraint is transferred to the micro-bore optical fiber connection channel through the high elastic inner ring wall.

According to the distributed sensing optical fiber multi-objective multi-degree-of-freedom static and dynamic test device of the present invention, the optical fiber multi-degree-of-freedom fixing system further includes a first intermediate pulley linkage device and a second intermediate pulley linkage device, a middle upper portion and a middle lower portion of a rear operating table are respectively provided with a placement slot penetrating longitudinally, configured to place the first intermediate pulley linkage device and the second intermediate pulley linkage device; in the first intermediate pulley linkage device, an angle adjustment round handle connected with a dial disc is manipulated to drive and control a rotary link rod; by taking a fixed support disc as a fixed support, a horizontal connection pulley extracts the optical fiber from the initial-end elastic fixation device and horizontally transits the optical fiber into the first intermediate pulley linkage device; the devices are encapsulated in to curved operation room, and is fixed into the rear operating table by a fastening screw; through a middle in-groove connection pulley placed on the rear operating table, the optical fiber under test extracted out of the first intermediate pulley linkage device is guided into a vertical small-bore optical fiber connection channel and is connected onto the second intermediate pulley linkage device; the second intermediate pulley linkage device includes a large-diameter transition pulley and a small-diameter transition pulley, which transit the optical fiber under test to a subsequent test section.

According to the distributed sensing optical fiber multi-objective multi-degree-of-freedom static and dynamic test device of the present invention, the optical fiber multi-degree-of-freedom fixing system further includes an end nonrigid fixation device; in the end nonrigid fixation device, a rotating ring is controlled to come in and go out by rotating to rotating ring cap; an inner wall of the rotating ring is internally provided with a screw, the optical fiber under test passes through an optical fiber connection channel of which the outer wall is provided with threads, one side of the optical fiber connection channel near the optical fiber is provided with an elastic material inner wall, is in contact with the optical fiber under test and transfers circumferential load into the optical fiber under test, an elastic material circular wall is subject to horizontal pressure of the rotating ring, an outer-edge thick-wall barrel applies hoop constraint onto the elastic material circular wall, and the circumferential load is transferred into the elastic material inner wall in the optical fiber connection channel.

In the distributed sensing optical fiber multi-objective multi-degree-of-freedom static and dynamic test device of the present invention, the connection pulley can be replaced with a special pulley internally provided with a spring, a threaded rod handle is connected with a threaded rod, one end of the threaded rod extends into the rear operating table, curved slots are respectively opened on one end of an upper elongated steel block and a lower elongated steel block, the other end corresponding thereto is respectively opened with slots, and a high elastic spring applies vertical load to the curved slots opposite thereto, so that the optical fiber under test is subject to hoop constraint.

According to the distributed sensing optical fiber multi-objective multi-degree-of-freedom static and dynamic test device of the present invention, the test device further includes two sets of optical fiber loading and unloading devices, for an artificial loading and unloading device, a threaded disc and a fixed disc connect and fix an artificial control handle with a front operation platform, a graduated horizontal beam penetrates a mobile platform, the graduated horizontal beam is marked with scales thereon, between the mobile platform and the front operation platform is a two-way force sensor, the artificial control handle is connected with a rotating horizontal threaded beam, two ends of the artificial control handle have a rotating handle and a fine-tuning control handle respectively, and the mobile platform is subject to a horizontal rotating force of the horizontal threaded beam to transfer horizontal load onto the initial-end elastic fixation device; and for the oil pressure control loading and unloading device, a telescopic cylinder is connected with an oil pressure loading and unloading control handle.

According to the distributed sensing optical fiber multi-objective multi-degree-of-freedom static and dynamic test device of the present invention, the test device further includes a special fixing round base, wherein a fixing round casing connects the special fixing round base to a bottom-end horizontal fixed horizontal column, and connects a fixing vertical round base through a connection steel plate.

According to the distributed sensing optical fiber multi-objective multi-degree-of-freedom static and dynamic test device of the present invention, in the test device, the optical fiber under test extends from the top end always along the text device to a lower end of a test platform to be finally connected with the distributed optical fiber Brillouin frequency shift acquisition system.

According to the distributed sensing optical fiber multi-objective multi-degree-of-freedom static and dynamic test device of the present invention, the device can apply dynamic and static load to the optical fiber through an optical fiber loading and unloading system, the distributed optical fiber Brillouin frequency shift acquisition system and the data processing and analysis system matching each other can achieve real-time collection and analysis of optical fiber information, and can complete performance test under different curvatures of the optical fiber and achieve direct or indirect monitoring, on parameters such as ultimate tensile load and comprehensive elasticity modulus thereof.

According to the distributed sensing optical fiber multi-objective multi-degree-of-freedom static and dynamic test device of the present invention, test steps are as follows:

the optical fiber under testis connected with the initial-end elastic fixation device, passes through the first intermediate pulley linkage device and the second intermediate pulley linkage device, and then is horizontally extracted to the distributed optical fiber Brillouin frequency shift acquisition system through the end nonrigid fixation device;

step 1: assembling various parts and carrying out debugging on running, according to a test objective, especially assembling the special pulley device and adjusting the rotating angle adjustment round handle to specify a test curvature, and laying out the optical fiber under test;

step 2: recording initial time, temperature and an initial gauge length of the optical fiber under test, determining a loading type and a dynamic and static monitoring manner, controlling loading series according to results monitored by the two-way force sensor, and then carrying out a force bearing test on a test piece;

step 3: based on the test objective, monitoring and collecting monitoring data such as lengths, angles and load of various parts; and step 4: based on the mechanical test of the optical fiber under test, performing real-time static and dynamic analysis according to the collected monitoring data.

Advantageous Effect

The distributed sensing optical fiber multi-objective multi-degree-of-freedom static and dynamic test device and method of the present invention provide a reliable dynamic and static multi-degree-of-freedom loading and unloading control system for model selection, design, production, procurement, construction and use of the optical fiber, and provide a better test platform for calibration of optical fiber sensing parameters, performance detection prior to application to engineering and further perfection of distributed optical fiber theories and actual applications thereof; the present invention ingeniously designs a variety of optical fiber elastic fixing systems, to make optical fiber lossless and fixed with multi-degree of freedom, and can arbitrarily change a bending angle of the optical fiber by relying on a unique pulley link rod device, to achieve multi-objective monitoring; use of specifically designed artificial and oil pressure loading and unloading systems achieves free control over optical fiber dynamic and static loading and unloading, and its Brillouin frequency shift acquisition system, force sensing system and temperature collection system and other auxiliary devices can achieve real-time collection and analysis on mechanical performance and sensing performance thereof.

The present invention is of important significance for precision calibration and improvement of the distributed optical fiber sensing technology in actual applications, all components of the test platform can be freely dissembled and assembled, and in order to complete different test requirements, a multi-objective test platform is set up, which provides large secondary development space for possible test and exploration; the device of the present invention has a large number of advantages such as a simple structure, a low cost, convenient operation, less disturbance, many test classes, strong adaptability, stable performance and convenient loading and unloading.

DETAILED DESCRIPTION OF THE INVENTION

Figure 1:
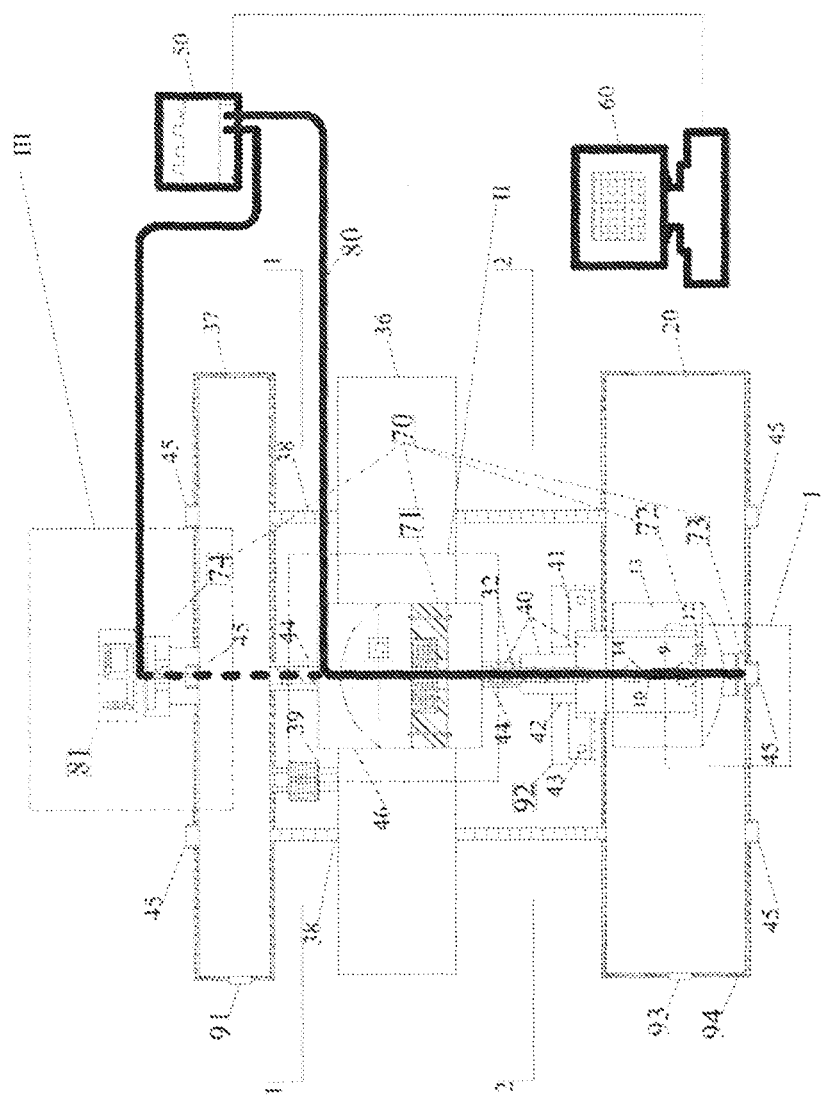
FIG. 1 is a schematic planar view of a distributed sensing optical fiber multi-objective multi-degree-of-freedom static and dynamic test device according to the present invention.
Figure 2:
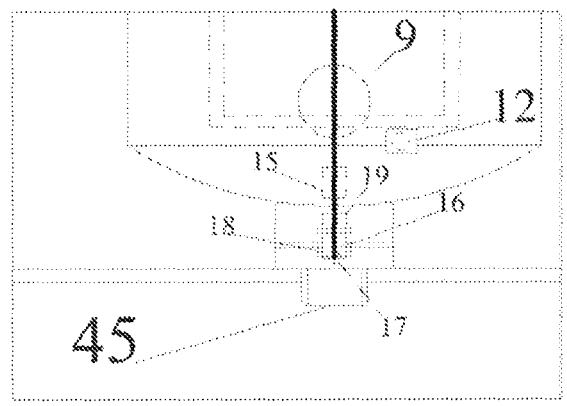
FIG. 2 is a schematic enlarged view of the structure of the part I in FIG. 1.
Figure 3:
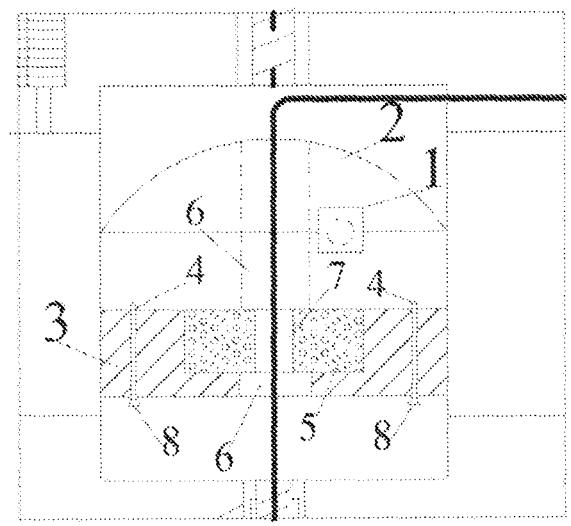
FIG. 3 is a schematic enlarged view of the structure of the part II in FIG. 1.
Figure 4:
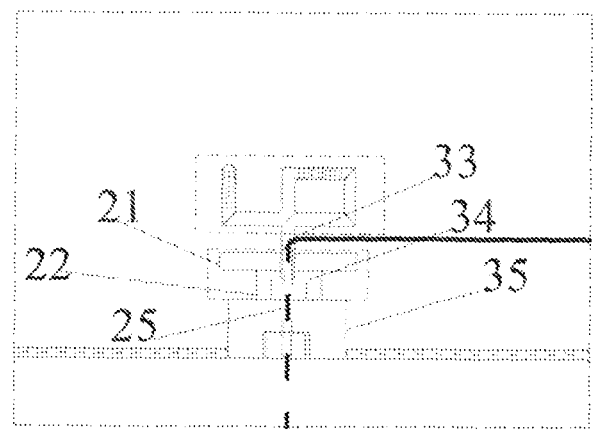
FIG. 4 is a schematic enlarged view of the structure of the part III in FIG. 1.
Figure 5:
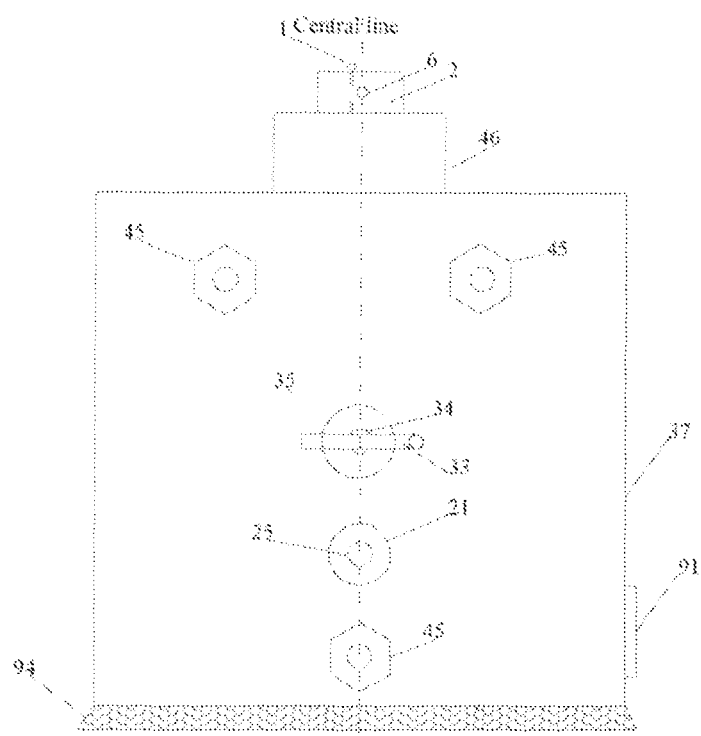
FIG. 5 is a front view of a distributed sensing optical fiber multi-objective multi-degree-of-freedom static and dynamic test device according to the present invention.
Figure 6:
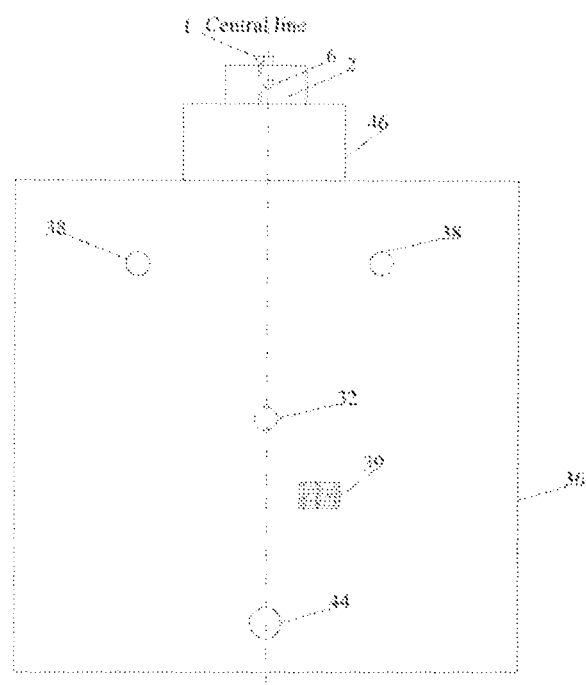
FIG. 6 is a 1-1 sectional view of the distributed sensing optical fiber multi-objective multi-degree-of-freedom static and dynamic test device according to the present invention.
Figure 7:
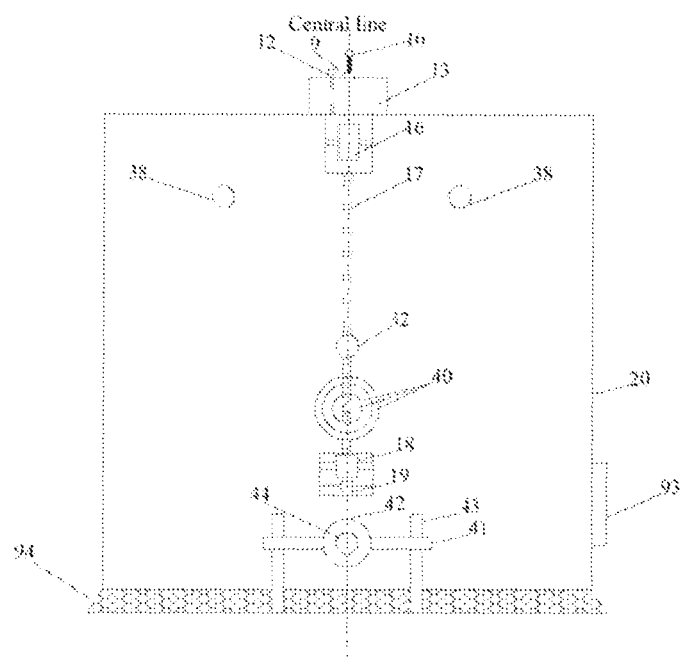
FIG. 7 is a 2-2 sectional view of the distributed sensing optical fiber multi-objective multi-degree-of-freedom static and dynamic test device according to the present invention.
Figure 8:
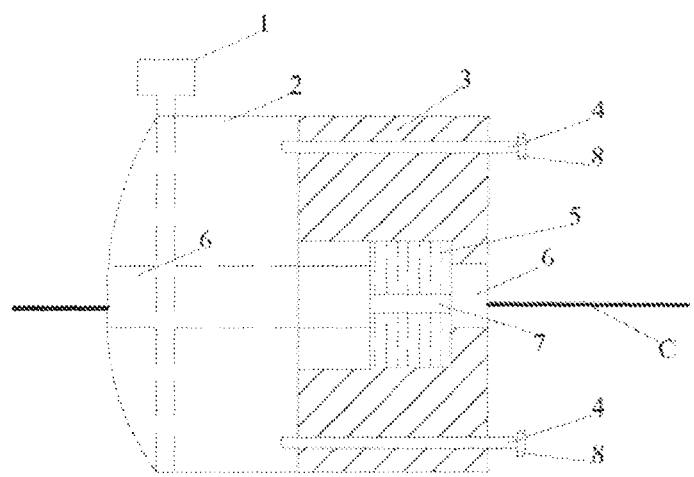
FIG. 8 is a sectional view of an initial-end elastic fixation device 71 in the test device according to the present invention.
Figure 9:
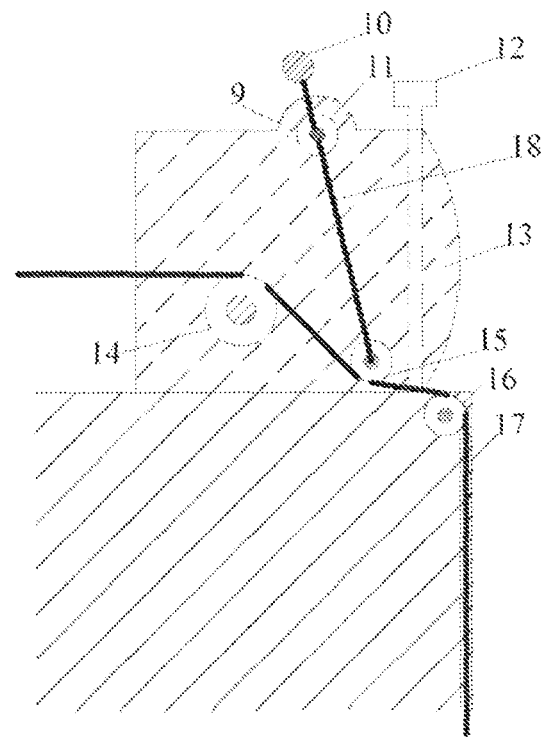
FIG. 9 is a sectional view of a first intermediate pulley linkage device 72 in the test device according to the present invention.
Figure 10:
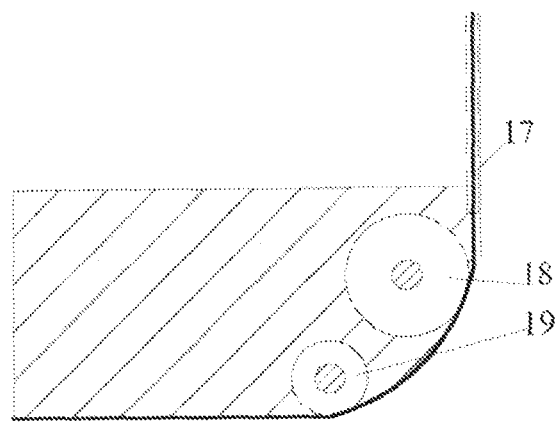
FIG. 10 is a sectional view of a second intermediate pulley linkage device 73 in the test device according, to the present invention.
Figure 11:
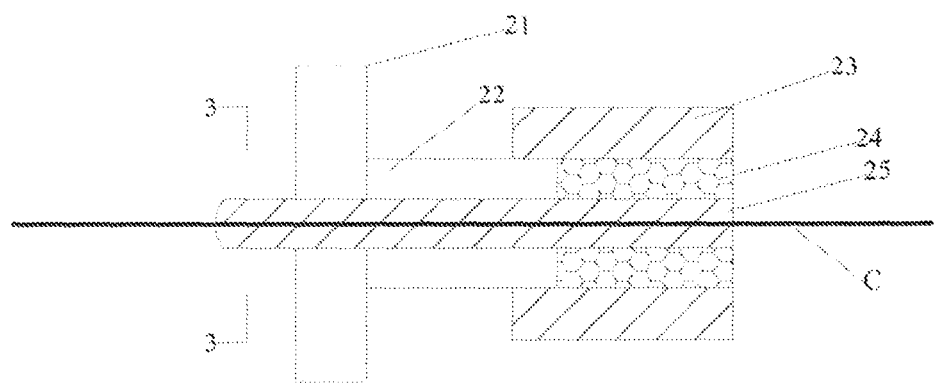
FIG. 11 is a sectional view of an end nonrigid fixation device 74 in the test device according to the present invention.
Figure 12:
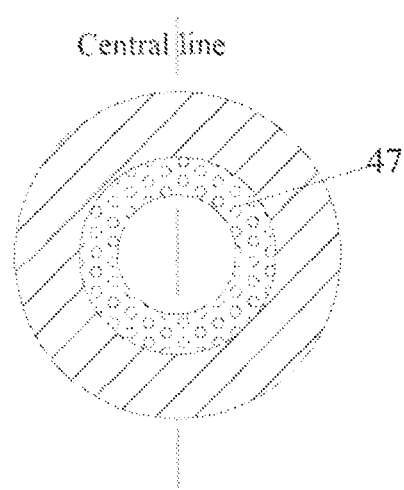
FIG. 12 is a 3-3 sectional view of the end nonrigid fixation device 74 in the test device according to the present invention.

The present invention is further described below in detail with reference to the accompanying drawings.

The distributed sensing optical fiber multi-objective multi-degree-of-freedom static and dynamic test device and method consist of an optical fiber multi-degree-of-freedom fixing system 70, an artificial loading and unloading device 81, an oil pressure control loading and unloading device 40, an optical fiber under test 80, a distributed optical fiber Brillouin frequency shift acquisition system 50, and a data processing and analysis system 60 and other auxiliary systems.

The optical fiber multi-degree-of-freedom fixing system mainly includes an initial-end elastic fixation device 71, a first intermediate pulley linkage device 72 and a second intermediate pulley linkage device 73 as well as an end nonrigid fixation device 74, and layout of the optical fiber under test in different directions and under different curvatures is achieved by controlling different devices in the multi-degree-of-freedom fixing system 70; the distributed optical fiber Brillouin frequency shift acquisition system 50 is mainly configured to acquire Brillouin frequency shift magnitude and other optical fiber optics information when the optical fiber is under a static or dynamic stress condition; the data processing and analysis system 60 is mainly configured to online process and analyze digital information acquired by the distributed optical fiber Brillouin frequency shift acquisition system, a force sensor, a high sensitive thermometer and the like; and other auxiliary test devices mainly include a high sensitive electronic thermometer 91, a special fixing round base 92, an oil pressure loading and unloading control handle 93 and a damping elastic bracket 94 and other matched accessory devices.

The optical fiber multi-degree-of-freedom fixing system 70 includes four optical fiber multi-degree-of-freedom fixation devices with different design ideas and use methods, wherein in the initial-end, elastic fixation device 71, the initial-end elastic fixation device is firmly fixed to an initial fixing-end placing table 46 by penetrating a fastening screw 1 through a curved front storehouse 2, the optical fiber passes through a small-bore optical fiber connection channel 6 in the curved front storehouse 2 and a micro-bore optical fiber connection channel 7 in a high elastic inner ring wall 5, axial pressure is constantly exerted on the high elastic inner ring wall 5 by rotating an adjusting bolt 8 on a connecting screw 4, the high elastic inner ring wall 5 is constantly forced under the axial pressure to be axially compressed, but its longitudinal cross-section, due to being hound by longitudinal pressure from a round L-shaped outer ring wall 3, constantly fastens the micro-bore optical fiber connection channel 7 longitudinally, and finally tightly presses the optical fiber in the micro-bore optical fiber connection channel 7 therein, and target optical fiber is fastened to a tensile end in a nonrigid manner with a method of linking transverse compression to longitudinal elastic deformation, which can effectively avoid physical damage generated due to in coordination of material hardness when the optical fiber is clamped by a rigid jig. The initial-end elastic fixation device 71 of the present invention is designed for special requirements of the test platform, which is easy to replace, is easy to operate, has strong practicality, and provides powerful guarantee for test on performance of the optical fiber.

The optical fiber multi-degree-of-freedom fixing system 70 includes a first intermediate pulley linkage device 72 and a second intermediate pulley linkage device 73. In the first intermediate pulley linkage device 72, a rotary link rod 18 is driven and controlled by manipulating an angle adjustment round handle 10 connected with a dial disc 9, an adjustable-angle pulley 15 is adjusted according to different test demands, so that a bending angle of the optical fiber changes herein, a fixed support disc 11 plays a role of fixing and support, a horizontal connection pulley 14 mainly horizontally transits the optical fiber extracted from the initial-end elastic fixation device 71 into the first intermediate pulley linkage device 72, the whole device is encapsulated in a curved operation room 13, which can be freely detached, to facilitate installation of the optical fiber and control operations, and mainly provide connection and operation space of various components, to protect various components from being disturbed by adverse environments possibly existing outside, the whole device is firmly fixed to the rear operating table 20 by a fastening screw 12, and the first intermediate pulley linkage device 72 of the present invention uses a lever balance principle to efficiently and accurately achieve control over the bending angle of the optical fiber through a fixed support, which has strong operability. Through a middle in-groove connection pulley 16 placed on the rear operating table, the optical fiber under test 80 extracted out of the first intermediate pulley linkage device 72 is guided into a vertical small-bore optical fiber connection channel 17 and is connected to the second intermediate pulley linkage device 73. The second intermediate pulley linkage device 73 mainly includes a large-diameter transition pulley 18 and a small-diameter transition pulley 19, to simply and effectively transit the optical fiber under test 80 to a subsequent test section; the second intermediate pulley linkage device 73 of the present invention ingeniously uses tangency of outer arcs of discs with unequal diameters to gently transit the optical fiber under test 80 from a vertical position to a horizontal position, which not only can flexibly adjust the position of the optical fiber but also can make bending curvature of the optical fiber herein completely conform to test requirements; a middle upper portion and a middle lower portion of the rear operating table are respectively provided with a placement slot penetrating longitudinally, to facilitate placement of the first intermediate pulley linkage device 72 and the second intermediate pulley linkage device 73.

The optical fiber multi-degree-of-freedom fixing system 70 further includes an end nonrigid fixation device 74. In the device, a rotating ring 22 can be controlled to come in and go out by rotating a rotating ring cap 21, an inner wall of the rotating ring is a threaded member, an optical fiber connection channel 25 is an optical fiber channel of which the outer wall is provided with a threaded thin layer, one side of the optical fiber channel near the optical fiber is provided with an elastic material inner wall 47 with a certain thickness, which is in contact with the optical fiber, can effectively transfer circumferential load into the optical fiber under test 80, and can ensure that the optical fiber is not compressed by a high-rigidity member with a larger rigidity magnitude difference to be damaged, when the rotating ring 22 is screwed, one end face thereof near an elastic material round wall 24 will squeeze the elastic material round wall 24, as an outer-edge thick-wall barrel 23 has greater rigidity, the rotating ring 22 is forced to be compressed towards the direction of the optical fiber connection channel 25, plus elastic expansion and compression properties of the elastic material inner wall 47 thereof, the optical fiber is fixed therein in a nonrigid manner. The nonrigid fixation device 74 of the present invention rationally uses the principle of force transfer and balance, ingeniously combines properties of elastic materials, links control load through rotation between threads, better achieves nonrigid linkage and fixing of the optical fiber, has simple operations, and provides another new way for effective operation and control over the optical fiber.

The test platform, when it is necessary to precisely compute temperature effects or temperature compensation in a situation such as the environment temperature changes greatly, can replace the ordinary connection pulley 16 with a special pulley internally provided with a spring. The special pulley device mainly extends into a threaded rod 27 of the rear operating table 20 through rotation of a threaded rod handle 26, which will jointly compress a high elastic spring 30, to drive the curved slots 29 opposite thereto for butt joint, the optical fiber under test 80 disposed therein will be compacted accordingly, and the device of the present invention fixes the optical fiber therein through the curved slots 29 moving oppositely of which outer layers are provided with elastic materials having a certain thickness by using the working principle of the spring, combining the idea of thread loading and unloading, and according to the principle of force balance, which is still an elastic fixation device, but is uniquely designed for the special vertical fixing position herein, can achieve flexible connection with the optical fiber and coordination deformation, and has novel ideas and a simple structure, wherein the curved slots 29 are respectively opened on one end of an upper elongated steel block 28 and a lower elongated steel block 31, and for backup, the other end corresponding thereto is respectively opened with slots. After the optical fiber under test 80 is fixed, the optical fiber under test 80 extending downwards from there to the end nonrigid fixation device 74 is fixed and in a free state, and is not affected by a loading device, which is a Brillouin frequency shift section only caused by temperature changes, and is used as a temperature compensation section for analysis and computation through the distributed optical fiber Brillouin frequency shift acquisition system 50.

The test platform includes an optical fiber loading and unloading system. In order to achieve different test demands, two optical fiber loading and unloading devices are designed. One is an artificial loading and unloading device 81, which mainly rotates a horizontal threaded beam 32 through an artificial control handle 33, rotates threads to drive a mobile platform 36 to horizontally move under stress, and then pulls the initial-end elastic fixation device 71 to horizontally move forward, so as to achieve artificial loading and unloading of the optical fiber, through a threaded disc 35 and a fixed disc 34, the artificial control handle 33 is connected with and fixed to a front operation platform 37, in FIG. 1, left and right ends of the artificial control handle 33 respectively have a rotating handle and a fine-tuning control handle, corresponding operations can be performed thereon according to different needs, a graduated horizontal beam 38 penetrates the mobile platform 36, mainly configured to real-time mark and display scales, between the mobile platform 36 and the front operation platform 37 is a two-way force sensor 39, mainly configured to acquire dynamic and static load and unloading values when the sensing optical fiber is affected by the loading and unloading device; the second loading device is an oil pressure control loading and unloading device, which mainly consists of a telescopic cylinder 40, an oil pressure loading and unloading control handle 93 and an oil pressure control system and other components.

In the test device, a high sensitive electronic thermometer 91 for temperature compensation computation is further installed, which can automatically read a current temperature and display current date and time, and is an effective supplement to judging external environment temperature effects, performing temperature compensation computation and recording a complete test process. In use, too large tensile load may exist, to cause the position of the device to change or occurrence of a special situation of use in a non-horizontal plane in actual engineering, and to this end, a special fixing round base 92 in another auxiliary system is specially designed: a fixing round casing 42 connects the special fixing round base 92 to a bottom-end horizontal fixed horizontal column 44, and connects a fixing vertical round base 43 through a connection steel plate 41, and in the event that fixing is necessary, the special fixing round base 92 is fixed to a desired fixing position through the fixing vertical round base 43 and a bolt bar. A damping hard elastic bracket 94 is installed to a bottom end of the whole test platform, which is mainly made of a built-in hard elastic material, and can be used to prevent external force interference and effects such as vibration existing in test and transport processes, to maximize reduction of interference of the external environment and improve accuracy and stability of test results of the optical fiber test platform.

In terms of the optical fiber Brillouin frequency shift acquisition system 50 in the test device, spatial resolution for different analysis meters varies greatly, the optical fiber under test 80 extends from the top end always along the test device to a lower end of the test platform, the unique run of the optical fiber increases the length of the optical fiber under test, and one of the objectives of the practice is to cause the device to be capable of better combining with optical fiber analysis meters having different spatial resolution for use.

When the optical fiber under test 80 is loaded by the optical fiber loading and unloading system, its Brillouin frequency shift variation value $(\Delta v_B)_{tensile}$ is related to the change of temperature T and strain $\epsilon$, which have a better linear relationship, Brillouin frequency shift $v_B(T)$ caused by the temperature T is expressed with a formula as $v_B(T)=v_B(T_0)+C_T\Delta T$, that is, $\Delta v_B(T)=v_B(T)-v_B(T_0)=\Delta T \times C'_T$, where $v_B(T_0)$ Brillouin frequency shift magnitude at an initial temperature, $\Delta v_B(T)$ is Brillouin frequency shift variation caused by a temperature change in a stretched section of the optical fiber under test, $C'_T$ is a temperature coefficient of the stretched section of the optical fiber under test, $\Delta T$ is a variation value of the temperature, and results can be acquired through the temperature compensation optical fiber or the high sensitive electronic thermometer 91; through the formula, the deformation magnitude of the optical fiber under test in the stretched section caused by an external temperature can be computed, $\Delta v_B(\epsilon,T)_{tensile}=\Delta v_B(\epsilon)_{tensile}+\Delta v_B(T)_{tensile}$ can be obtained according to $\Delta v_B(\epsilon,T)_{tensile}=C'_\epsilon\Delta\epsilon+C'_T\Delta T$, $\Delta v_B(\epsilon,T)_{tensile}-\Delta v_B(T)_{tensile}$ can be obtained, and it is finally computed that the deformation magnitude monitored by using the test platform is $$\Delta\varepsilon_{tensile} = \frac{\Delta v_B(\varepsilon, T)_{tensile} - \Delta v_B(T)_{tensile}}{C'_\epsilon},$$

where $\Delta v_B(\epsilon,T)_{tensile}$ is Brillouin frequency shift variation value caused by coupling of strain and temperature, $\Delta\epsilon$ is a change of the strain, $\Delta v_B(\epsilon)_{tensile}$ and $\Delta v_B(T)_{tensile}$ are respectively Brillouin frequency shift variation values caused by the strain and the temperature of the optical fiber in a stretching section, $C'_\epsilon$ is a strain coefficient of the optical fiber under test in the stretched section, and $\Delta\epsilon_{tensile}$ is a strain variation value caused by stress of the optical fiber in the stretched section.

The data processing and analysis system 60 mainly accesses, processes and analyzes digital measurement information acquired by the analysis meter 50, the two-way force sensor 39, the high sensitive electronic thermometer 91 and the like, and draws a curve of information time course changes.

The platform can applies dynamic and static load to the optical fiber through the optical fiber loading and unloading system, the distributed optical fiber Brillouin frequency shift acquisition system 50 and the data processing and analysis system 60 matching each other can achieve real-time collection and analysis of optical fiber information, can complete performance test under different curvatures of the optical fiber, and can achieve direct or indirect monitoring on parameters such as ultimate tensile load and comprehensive elasticity modulus thereof. For example, a recorded initial gauge length of the optical fiber is $l_0$, after certain load is applied, the acquired load value is $F_0$, at this time, the length of the optical fiber is $l_{00}$, then the strain value is $$\frac{l_{00}-l_0}{l_0},$$

the stress value corresponding thereto is $$\frac{F_0}{s_0},$$

$s_0$ is a corresponding cross-sectional area of the optical fiber, and it can be computed through the device that the corresponding comprehensive elasticity modulus of the optical fiber is $$\left(\frac{F_0}{s_0}\right) \Big/ \left(\frac{l_{00} - l_0}{l_0}\right).$$

The platform can further perform a high-precision optical fiber mechanical property calibration test, through the above operations, an initial effective tensile length of the optical fiber under test is written as $l_1$, after being affected by the loading device, the effective tensile length of the optical fiber is written as $l_2$, an optical fiber strain value acquired by a deformation control and monitoring device is $$\Delta \varepsilon = \frac{l_2 - l_1}{l_1} = \frac{\Delta l}{l_1},$$

a temperature change value monitored by using the high sensitive electronic thermometer 91 is $\Delta T$, strain magnitude of the mth loading relative to the initial one is $\Delta \epsilon_m$, the corresponding temperature variation value is $\Delta T_m$, a dependent variable change value corresponding to the nth loading is $\Delta \epsilon_n$ (m≠n), the corresponding temperature variation value is $\Delta T_n$, the following computation formula $$\begin{cases} \Delta \varepsilon_m C_\varepsilon + \Delta T_m C_T = (\Delta V_B)_m \\ \Delta \varepsilon_m C_\varepsilon + \Delta T_n C_T = (\Delta V_B)_n \end{cases}$$

can be obtained according to the principle of optical fiber Brillouin frequency shift computation, by use of the above formula, $$\begin{cases} \Delta \varepsilon_n \Delta \varepsilon_m C_\varepsilon + \Delta \varepsilon_n \Delta T_m C_T = \Delta \varepsilon_n (\Delta V_B)_m \\ \Delta \varepsilon_m \Delta \varepsilon_n C_\varepsilon + \Delta \varepsilon_m \Delta T_n C_T = \Delta \varepsilon_m (\Delta V_B)_n \end{cases}$$

can be obtained, and then $$\begin{cases} C_T = \dfrac{\Delta \varepsilon_n (\Delta V_B)_m - \Delta \varepsilon_m (\Delta V_B)_n}{\Delta \varepsilon_n \Delta T_m - \Delta \varepsilon_m \Delta T} \\ C_\varepsilon = \dfrac{(\Delta V_B)_m \Delta T_n - \Delta T_m (\Delta V_B)_n}{\Delta T_n \Delta \varepsilon_m - \Delta T_m \Delta \varepsilon_n} \end{cases}$$

can be obtained, where $C_\epsilon$ is a strain coefficient, $C_T$ is a temperature coefficient, and $(\Delta V_B)_i$ is a Brillouin frequency shift variation value under the i th loading. By use of the test platform and according to the deduction process of the formula, high-precision calibration can be performed on the temperature coefficient and the strain coefficient of the optical fiber under test 80 by means of the device of the present invention, the device and the method of the present invention can also be oriented to test work before the optical fiber is applied to actual engineering; when more precise calibration results are required, computation can be performed multiple times, a normal distribution principle is obeyed according to computation results, and more precise calibration results are obtained finally.

Embodiment 1

This embodiment takes SMF-28e Common single-mode optical fiber as an example, to describe making and assembling steps of main devices in the present invention:

In a first step, a steel plate that is 180 mm long, 30 mm wide and 120 mm high is used to make the front operation platform 37, the mobile platform 36 is made into a steel plate which is 180 mm long, 60 mm wide and 60 mm high, and a steel plate that is 180 mm long, 50 mm wide and 140 mm high is used to make the rear operating table 20; an M24 standard bolt hole is machined in two corner portions on upper ends of the front operation platform 37, the mobile platform 36 and the rear operating table 20 respectively, an M27 standard bolt hole is machined in middle lower portions of the front operation platform 37 and the rear operating table 20 respectively, a round hole of 30 mm is machined in a middle lower portion of two bolt holes of the front operation platform 37, and an M20 bolt hole is machined in corresponding positions of the top of the rear operating table 20 and the mobile platform 36, used for placing different types of optical fiber elastic fixation devices. A slot hole penetrating longitudinally is opened on a middle upper portion of the rear operating table 20, mainly used for placing the pulley device 16, a small-bore optical fiber connection channel penetrating vertically is opened at the bottom end of the slot hole close to an outer side, and a slot hole penetrating longitudinally is opened on a middle lower end of the rear operating table 20, used for placing the second intermediate pulley linkage device 73.

In a second step, the bottom-end horizontal fixed horizontal column 44 is 620 mm long, has a diameter of 27 mm, and has threads on two ports, at first, the special fixing round base 92 whose size is slightly greater than that of the bottom-end horizontal fixed horizontal column 44 is sheathed at the bottom-end horizontal fixed horizontal column 44, the bottom-end horizontal fixed horizontal column 44 is used to connect the front operation platform 37 with the rear operating table 20, the front operation platform 37, the mobile platform 36 and the rear operating table 20 are connected through the graduated horizontal beam 38 which has a length of 620 mm, has a diameter of 24 mm and has threads at two ports, a threaded disc 35 which has a diameter of 50 mm and a thickness of 30 mm is used to externally connect a fixed disc 34 which has a diameter of 18 mm to connect the artificial control handle 33 with the rotating horizontal threaded beam 32 which has a length of 500 mm and a diameter of 30 mm through a round hole on the front operation platform 37, and finally bolts of corresponding specifications are used to closely fix the components.

In a third step, in consideration of complexity and high making technologies of various optical fiber elastic fixation devices and other precision components, detailed making steps and technologies are not detailed herein, and various optical fiber elastic fixation devices made in advance are installed to designated positions of various parts according to specified design.

In a fourth step, with reference to the content in the specification, each component in other auxiliary systems is selected and installed according to specific test requirements. Finally, the optical fiber Brillouin frequency shift acquisition system 50 and the data processing and analysis system 60 are connected with the assembled test system, to make up a distributed sensing optical fiber performance multi-objective multi-degree-of-freedom static and dynamic test integrated platform which combines a loading and unloading system, a force measuring system, a sensing system and a data processing and analysis system.

Embodiment 2

In order to facilitate illustration of the most basic operation steps of the platform, specific illustration is given only by taking test on deformation performance of the distributed optical fiber under horizontal axial stretching of the optical fiber as an example.

1. Test Material and Test Piece

SMF-28e common single-mode optical fiber is used, as it is not bare fiber and has a rubber protection layer outside, tight tube optical fiber sequentially passes through the initial-end elastic fixation device 71, the first intermediate pulley linkage device 72, the second intermediate pulley linkage device 73 and the end nonrigid fixation device 74, and an NBX-6050A type pre-pumping Brillouin Optical Time-Domain Analysis (BOTDA) distributed optical fiber Brillouin frequency shift acquisition system, a DVP-730 type optical fiber fusion splicer, a number of heat shrink tubings, a DVP'105 type optical fiber cleaver, a Panasonic-CF-FGCYCDP type data processing and analysis system and other matched devices are used.

2. Test Step

Step 1: at first, the angle adjustment round handle 10 is rotated according to a certain curvature, the initial-end elastic fixation device 71 and the end nonrigid fixation device 74 where the optical fiber under test has penetrated tighten the device by adjusting corresponding components.

Step 2: two ends of the optical fiber under test are respectively connected with ports of an NBX-6050A type pre-pumping BOTDA distributed optical fiber monitoring system, the two-way force sensor 39 is fixed to a corresponding position, the high sensitive electronic thermometer is opened, and the Panasonic-CF-FGCYCDP type data processing and analysis system is connected to various monitoring components, to complete preparation work before loading.

Step 3: start time and start temperature are recorded, a loading type is selected, to facilitate illustration, the test is carried out by selecting a manual loading manner, an initial gauge length before loading is calibrated, a value thereof is recorded, then the angle adjustment round handle 10 is rotated, the loading series is controlled according to results monitored by the two-way force sensor 39, find-tuning loading is performed by rotating a handheld turning handle on the angle adjustment round handle 10, to achieve real-time dynamic precise control, and Brillouin frequency shift values are collected constantly by using NBX-6050A and strain results are computed by using the Panasonic-CF-FGCYCDP type data processing and analysis system.

Step 4: according to the objective of the test, the value of the thermometer is recorded instantly each time the angle adjustment round handle 10 makes a round, and NBX-6050A is used to perform optical fiber strain monitoring.

3. Analysis of Test Result

Strain results of preset eight loadings are analyzed, at first, through the temperature changes recorded by the thermometer, it is found that the temperature always keeps around 20°, the test temperature change $\Delta T \approx 0$ can be obtained through $(\Delta v_B)_T = C_{vT}\Delta T$. Brillouin frequency shift caused may not be taken into account, and in combination with that the whole test time is short and the temperature in the indoor test basically keeps constant, in terms of the recorded temperature, the strain caused by the temperature change can be omitted.

Figure 13:
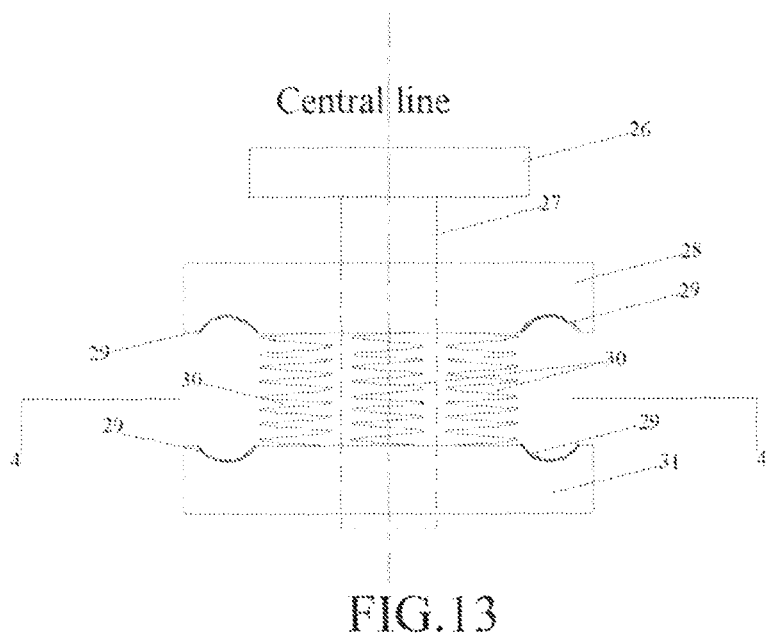
FIG. 13 is a sectional view of a special pulley device 16 in the test device according to the present invention.
Figure 14:
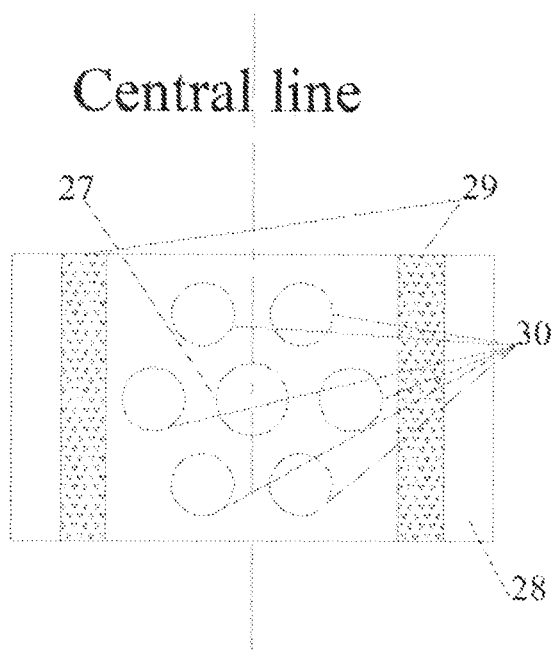
FIG. 14 is a 4-4 sectional view of the special pulley device 16 in the test device according to the present invention.
Figure 15:
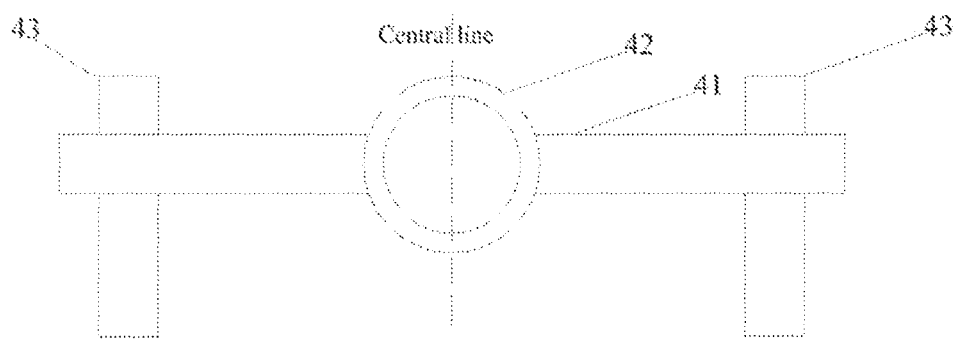
FIG. 15 is a sectional view of a special fixing round base 92 in the test device according to the present invention.
Figure 16:
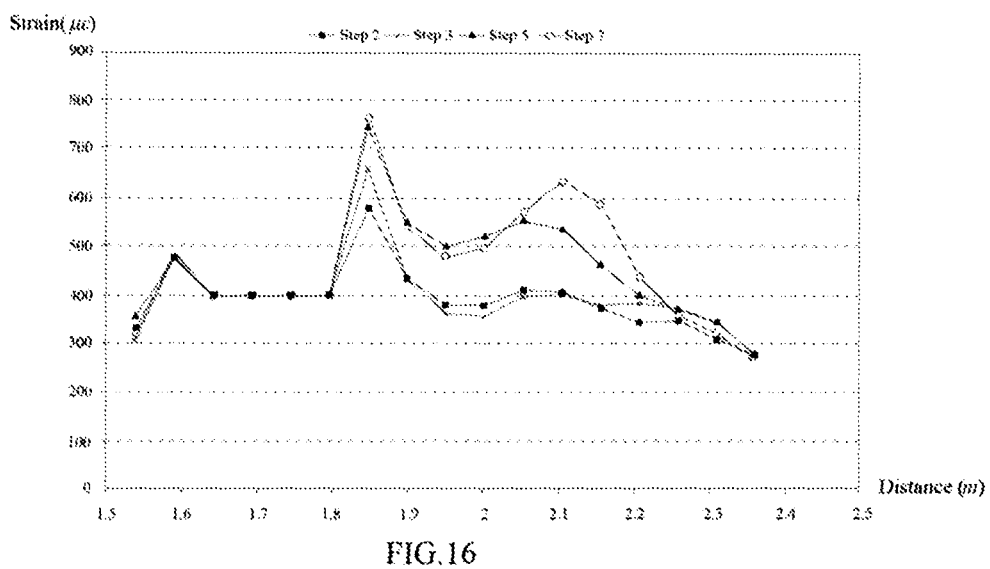
FIG. 16 is a comparison view of optical fiber horizontal tensile tests based on the device of the present invention.

The tensile strain value of the optical fiber under test 80 is computed and obtained through the formulas $\Delta v_B(\epsilon,T) = C_{v\epsilon}\Delta\epsilon + C_{vT}\Delta T$ and $\Delta v_B(\epsilon) = \Delta v_B(\epsilon,T) - \Delta v_B(T)$, then a benchmark analysis approach is used to subtract an initial result from the strain value of each loading step, to deduct the effect of the initial stress, and only deformation in the tensile loading process is considered; please refer to FIG. 13 for comparative analysis results; in FIG. 13, comparison values of results of four loadings are listed, after deduction of unmodifiable reasons such as relative displacement exists when the internal material is stretched during optical fiber making, viewed from the four result values, at a partial tensile section of 1.8 m to 2.25 m including the length of the jig, with continuous increase of the loading step, the tensile strain value of the optical fiber increases constantly on the Whole, changes to the greatest extent on the middle load step, and increases less in loading initial and ultimate phases.

Rationality and feasibility of the device and the test method of the present invention are verified through test verification and result comparison and analysis.

As stated above, although the present invention has been represented and expressed according to specific preferred embodiments, the embodiments should not be construed as limitations to the present invention. Various changes can be made to forms and details thereof without departing from the spirit and scope of the present invention defined by the appended claims.

What is claimed is:

1. A distributed sensing optical fiber multi-objective multi-degree-of-freedom static and dynamic test device, comprising an optical fiber multi-degree-of-freedom fixing system, which includes an initial-end elastic fixation device and an end nonrigid fixation device; an artificial loading and unloading device, which rotates a horizontal threaded beam through an artificial control handle, rotates threads to drive a mobile platform to horizontally move under stress, and then pulls the initial-end elastic fixation device to horizontally move forward, so as to achieve artificial loading and unloading of an optical fiber; an oil pressure control loading and unloading device, which mainly consists of a telescopic cylinder, an oil pressure loading and unloading control handle and an oil pressure control system; an optical fiber under test; a distributed optical fiber Brillouin frequency shift acquisition system; and a data processing and analysis system, which is configured to online process and analyze digital information acquired by the distributed optical fiber Brillouin frequency shift acquisition system, a two-way force sensor, and a high sensitive thermometer, and draws a curve of information time course changes; wherein the optical fiber multi-degree-of-freedom fixing system is sequentially connected with the artificial loading and unloading device and the oil pressure control loading and unloading device, and the optical fiber under test is connected with the optical fiber multi-degree-of-freedom fixing system and the distributed optical fiber Brillouin frequency shift acquisition system; test on performance of optical fiber is achieved by controlling devices in the optical fiber multi-degree-of-freedom fixing system; the distributed optical fiber Brillouin frequency shift acquisition system is configured to acquire Brillouin frequency shift magnitude and other optical fiber optics information when the optical fiber is under a static or dynamic stress condition.

2. The distributed sensing optical fiber multi-objective multi-degree-of-freedom static and dynamic test device of claim 1, wherein the initial-end elastic fixation device penetrates a curved front storehouse through a fastening screw to fix the initial-end elastic fixation device onto an initial fixing-end placing table, the optical fiber passes through a small-bore optical fiber connection channel in the curved front storehouse and a micro-bore optical fiber connection channel in a elastic inner ring wall, an axial pressure is exerted on the elastic inner ring wall by rotating an adjusting bolt on a connecting screw, a transverse pressure is exerted on the elastic inner ring wall through a circular outer ring wall with L-shaped cross-section, and a hoop constraint is transferred to the micro-bore optical fiber connection channel through the elastic inner ring wall.

3. The distributed sensing optical fiber multi-objective multi-degree-of-freedom static and dynamic test device of claim 1, wherein in the end nonrigid fixation device, a rotating, ring is controlled to come in and go out by rotating a rotating ring cap; an inner wall of the rotating ring is internally provided with a screw, the optical fiber under test passes through an optical fiber connection channel of which the outer wall is provided with threads, one side of the optical fiber connection channel near the optical fiber is provided with an elastic material inner wall, is in contact with the optical fiber under test and transfers circumferential load into the optical fiber under test, an elastic material circular wall is subject to horizontal pressure of the rotating ring, an outer-edge barrel applies hoop constraint onto the elastic material circular wall, and the circumferential load is transferred into the elastic material inner wall in the optical fiber connection channel.

4. The distributed sensing optical fiber multi-objective multi-degree-of-freedom static and dynamic test device of claim 1, wherein a threaded disc and a fixed disc on the artificial loading and unloading device connect and fix an artificial control handle with a front operation platform, a graduated horizontal beam penetrates a mobile platform, the graduated horizontal beam is marked with scales thereon, between the mobile platform and the front operation platform is the two-way force sensor, the artificial control handle is connected with a rotating horizontal threaded beam, two ends of the artificial control handle have a rotating handle and a tuning control handle respectively, and the mobile platform is subject to a horizontal rotating force of the horizontal threaded beam to transfer horizontal load onto the initial-end elastic fixation device; and a telescopic cylinder on the oil pressure control loading and unloading device is connected with an oil pressure loading and unloading control handle.

5. The distributed sensing optical fiber multi-objective multi-degree-of-freedom static and dynamic test device of claim 1, further comprising a fixing round base, wherein a fixing round casing connects the fixing round base to a bottom-end horizontal fixed horizontal column, and connects a fixing vertical round base through a connection steel plate.

6. The distributed sensing optical fiber multi-objective multi-degree-of-freedom static and dynamic test device of claim 1, wherein the optical fiber under test extends from a top end always along the test device to a lower end of a test platform to be connected with the distributed optical fiber Brillouin frequency shift acquisition system.

7. The distributed sensing optical fiber multi-objective multi-degree-of-freedom static and dynamic test device of claim 1, wherein a dynamic and static load is exerted on the optical fiber through an optical fiber loading and unloading system, which is the artificial loading and unloading device or the oil pressure control loading and unloading device, the distributed optical fiber Brillouin frequency shift acquisition system and the data processing and analysis system matching each other achieve real-time collection and analysis of optical fiber information, to complete performance test under different curvatures of the optical fiber and achieve direct or indirect monitoring on parameters such as ultimate tensile load and comprehensive elasticity modulus thereof.

8. The distributed sensing optical fiber multi-objective multi-degree-of-freedom static and dynamic test device of claim 1, wherein the optical fiber multi-degree-of-freedom fixing system further comprises a first intermediate pulley linkage device and a second intermediate pulley linkage device, a middle upper portion and a middle lower portion of a rear operating table are respectively provided with a placement slot penetrating longitudinally, configured to place the first intermediate pulley linkage device and the second intermediate pulley linkage device; in the first intermediate pulley linkage device, an angle adjustment round handle connected with a dial disc is manipulated to drive and control a rotary link rod; by taking a fixed support disc as a fixed support, a horizontal connection pulley extracts the optical fiber from the initial-end elastic fixation device and horizontally transits the optical fiber into the first intermediate pulley linkage device; the first intermediate pulley linkage device and the second intermediate pulley linkage device are encapsulated in a curved operation room, and is fixed into the rear operating table by a fastening screw; through a middle in-groove connection pulley placed on the rear operating table, the optical fiber under test extracted out of the first intermediate pulley linkage device is guided into a vertical small-bore optical fiber connection channel and is connected onto the second intermediate pulley linkage device; the second intermediate pulley linkage device comprises a large-diameter transition pulley and a small-diameter transition pulley, and the large-diameter transition pulley and the small-diameter transition pulley are configured to transit the optical fiber under test to a subsequent test section.

9. The distributed sensing optical fiber multi-objective multi-degree-of-freedom static and dynamic test device of claim 8, wherein a connection pulley is a pulley internally provided with a spring, a threaded rod handle is connected with a threaded rod, one end of the threaded rod extends into the rear operating table, curved slots are respectively opened on one end of an upper elongated steel block and a lower elongated steel block, the other end corresponding thereto is respectively opened with slots, and an elastic spring applies vertical load to the curved slots opposite thereto and hoop constraint to the optical fiber under test.

10. A test method that uses the distributed sensing optical fiber multi-objective multi-degree-of-freedom static and dynamic test device of claim 9 wherein the test method comprises the following steps:

the optical fiber under test is connected with the initial-end elastic fixation device, passes through the first intermediate pulley linkage device and the second intermediate pulley linkage device, and then is horizontally extracted to the distributed optical fiber Brillouin frequency shift acquisition system through the end nonrigid fixation device;

step 1: assembling various parts and carrying out debugging on running, according to a test objective, assembling the pulley device and adjusting a rotating angle adjustment round handle to specify a test curvature, and laying out the optical fiber under test;

step 2: recording initial time, temperature and an initial gauge length of the optical fiber under test, determining a loading type and a dynamic and static monitoring manner, controlling loading series according to results monitored by the two-way force sensor, and then carrying out a force bearing test on a test piece;

step 3: based on the test objective, monitoring and collecting monitoring data lengths, angles and load of various parts; and step 4: based on the force bearing test of the optical fiber under test, performing real-time static and dynamic analysis according to the collected monitoring data.

* * * * *